United States Patent [19]

Walbrun

[11] 4,307,141
[45] Dec. 22, 1981

[54] MULTI-PLY FIBROUS SHEET STRUCTURE

[75] Inventor: Lawrence A. Walbrun, Menasha, Wis.

[73] Assignee: American Can Company, Greenwich, Conn.

[21] Appl. No.: 174,858

[22] Filed: Aug. 4, 1980

Related U.S. Application Data

[63] Continuation of Ser. No. 950,076, Oct. 10, 1978, abandoned.

[51] Int. Cl.³ .................. B32B 3/10; B32B 3/00; B32B 7/00
[52] U.S. Cl. .................. 428/132; 156/209; 156/252; 428/137; 428/154; 428/166; 428/178; 428/211
[58] Field of Search .............. 428/132, 137, 154, 166, 428/178, 211, 188; 156/209, 252; 162/109, 112, 114, 132, 362

[56] References Cited

U.S. PATENT DOCUMENTS

| | | | |
|---|---|---|---|
| 2,281,945 | 5/1942 | Milliken | 92/68 |
| 2,847,086 | 8/1958 | Müller | 162/114 |
| 3,323,983 | 6/1967 | Palmer et al. | 162/362 |
| 3,546,056 | 12/1970 | Thomas | 161/57 |
| 3,738,905 | 6/1973 | Thomas | 428/154 |

*Primary Examiner*—Paul J. Thibodeau
*Attorney, Agent, or Firm*—Robert P. Auber; George P. Ziehmer; Harry W. Hargis, III

[57] ABSTRACT

An absorbent, puffy sheet structure comprising a pair of plies of web material adhered in continuous linear regions interspersed with pocket portions. Portions of the plies forming the pocket portions include inwardly presented perforate bosses that enhance softness and water absorbency. The structure is achieved utilizing apparatus comprising a pair of matched-pattern, synchronously rotatable steel rolls each provided with small, sharp, ply-perforating members in the recesses between land areas, in combination with synchronous rotatable rubber embossing rolls urged against the rotatable steel rolls and intervening plies to form the perforate bosses.

8 Claims, 4 Drawing Figures

MULTI-PLY FIBROUS SHEET STRUCTURE

This is a continuation, of application Ser. No. 950,076, filed Oct. 10, 1978 and now abandoned.

BACKGROUND OF THE INVENTION

This invention relates to improvements in the fabrication of multi-ply fibrous sheet structure, particularly of the soft absorbent type, such as, for example, paper towels.

In the fabrication of paper towels, efforts have been directed to improving the water holding capacity thereof involving, for example, such techniques as creping, puffing, peforating and the like to increase the surface area of the towel. Perforating has generally been effected using prior art embossing techniques in which pins are pushed through from one side of a web to leave outwardly extending projections of fibers on an exposed surface of the web.

The following U.S. Pat. Nos. are representative of the prior art, and are believed material to the Examination of this application:

2,281,945 discloses perforation of a multi-ply sheet A to form a plurality of small tufts or mounds B projecting away from surfaces of the sheet to enhance its cleansing action.

3,323,983 discloses apparatus for embossing superposed paper plies 14 between embossing rolls 10, 11 provided with mating pegs 12, 13.

3,546,056 discloses a sheet comprising plies of wadding 4, 5 on each side of an open mesh scrim 1. Pin embossments 25 project from one side of the sheet in provision of a roughened surface of improved cleansing action.

It is a general objective of the present invention to provide multi-ply sheet structure of improved absorbency and softness.

It is a further objective of the invention to provide apparatus for fabricating a multi-ply sheet structure of improved absorbency and softness.

SUMMARY OF THE INVENTION

In achievement of the foregoing as well as other objectives and advantages, the invention contemplates fabrication of multi-ply fibrous sheet structure comprising: a pair of plies of web material adherent to one another in substantially continuous linear regions and defining pocket portions in non-adherent regions thereof; and means in the plies defining the pocket portions forming perforations having projecting fibers disposed thereabout and confronting the projecting fibers of the opposite one of said plies.

The manner in which the foregoing as well as other objectives and advantages of the invention may best be achieved will be more fully understood from a consideration of the following description, taken in light of the accompanying drawing.

DESCRIPTION OF THE PREFERRED EMBODIMENTS

Figure 1:
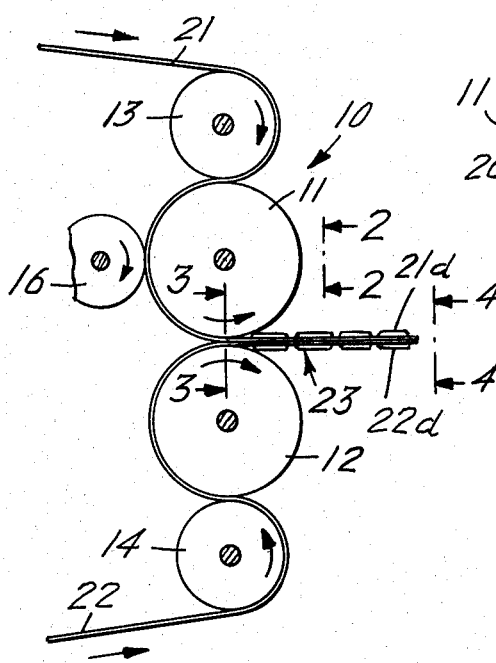
FIG. 1 is a diagrammatic elevational showing of the apparatus contemplated by the invention.

With more detailed reference to the drawing, and first to FIG. 1, an apparatus 10 includes a pair of embossing rolls 11 and 12 made of substantially rigid material, such as steel, provided with matching patterns to be described in detail in what follows. Rolls 11 and 12 are of like diameters, are mounted for rotation about parallel axes, by suitable drive means of conventional construction, and are so cooperably disposed as to form a ply bonding nip.

A pair of embossing rolls 13 and 14 made of substantially flexible and resilient material, such as rubber, are mounted for rotation about parallel axes by known suitable drive means, and are so cooperably disposed as respects steel rolls 11 and 12 respectively, to form embossing nips therewith.

A pair of webs 21 and 22 of paper, for example creped coarse fiber stock such as is used in paper toweling, are fed from suitably arranged supply rolls (not shown) over rubber rolls 13 and 14, respectively. Web 21 then is fed between rolls 11 and 13, while web 22 is fed between rolls 12 and 14, and by this feed there is formed in each web the matching embossed patterns of rolls 11 and 12. An adhesive applicator device of conventional construction includes an applicator roll 16 disposed for tangential engagement with web 21 on embossing roll 11. As web 21 is fed past applicator roll 16, adhesive is applied to land areas thereof, also to be described in what follows, and continued rotation of the rolls drives webs 21 and 22 into the ply bonding nip of rolls 11 and 12, from which the bonded webs exit as a finished, multi-ply sheet structure 23 of improved absorbency and puffiness.

Figure 2:
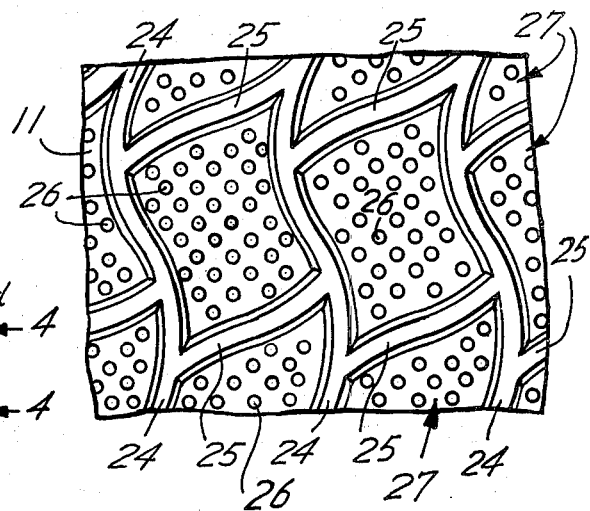
FIG. 2 is an enlarged, fragmented elevational view of the apparatus in FIG. 1, looking in the direction of arrows 2-2 applied thereto.

Turning to FIG. 2, and in particular accordance with the improvements contemplated by the invention, embossing patterns on roll 11 comprise generally circumferentially extending land regions 24 between which are disposed generally axially extending, intersecting land regions 25. These land regions 24 and 25 are therefore of substantially continuous linear extent, in a generally quadrilateral configuration, and are thus so cooperably disposed as to form recessed sections 27. The bottom surfaces of recessed sections 27 are provided with a plurality of sharp protuberant members 26.

Figure 3:
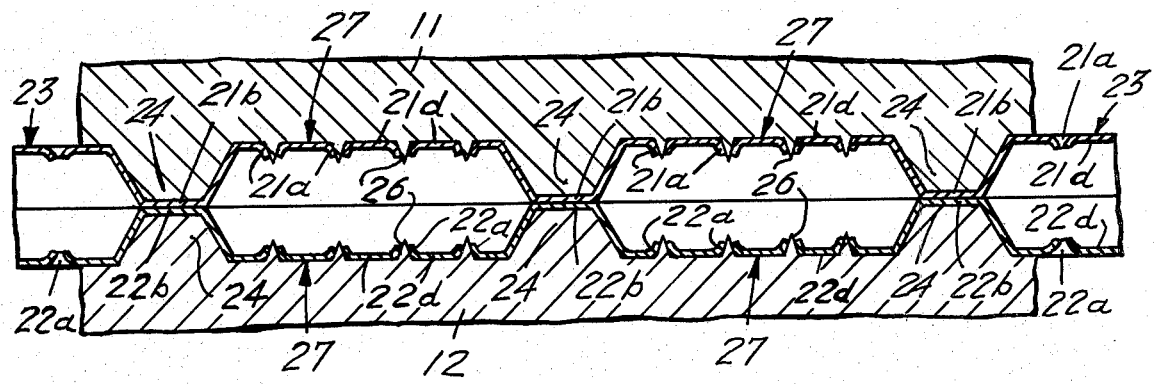
FIG. 3 is a fragmented sectional view of the apparatus and product taken in the plane of line 3-3 in FIG. 1, and looking in the direction of arrows applied thereto.

It will be understood that in view of the identical structure of patterned rolls 11 and 12, and as is seen in FIG. 3, the same reference numerals 24, 25, 26, and 27 have been applied thereto.

Rubber rolls 13 and 14 are of such flexibility and resiliency that when urged against a corresponding steel roll, and an intervening web 21 or 22, respective portions 21*d* and 22*d* of the webs are urged into the recessed sections 27 with sufficient force to form portions or bosses in the webs, and further to cause these same web portions to be pierced by relatively sharp protuberances such as members 26, forming a relatively fine emboss pattern including perforations designated generally by numerals 21*a*, 22*a* in FIG. 3. Under the same urging by the rubber rolls 13 and 14 the land regions 24 and 25 cooperate therewith to form flat regions 21*b*, 22*b* in the webs. It will be appreciated that perforation of each web is aided by stretching of the material thereof in its weaker, cross-machine direction as it is urged into each recessed section 27.

It is to be appreciated that: the distance between mating lands 24, 25 of rolls 11 and 12 is slightly less than the combined thicknesses of webs 21 and 22; the distance between the surface of a land 24, 25 and the bottom surface of a recessed section 27 is greater than the thickness of a web 21 or 22; and the height of a member 26 is less than the aforesaid distance, but is of course sufficient to perforate a web 21 or 22 urged thereagainst by a roller 13 or 14.

In operation of the apparatus, adhesive is applied to the flat regions 21b of upper web 21 as it is moved past adhesive applicator roll 16. Continued rotation of the rolls 11, 12, 13 and 14 feeds embossed webs 21 and 22 into the nip of rollers 11 and 12, as is seen in FIG. 3, where the flat regions 21b and 22b of the respective webs are adhered to one another and exit from the apparatus 10 as a finished sheet 23.

Figure 4:
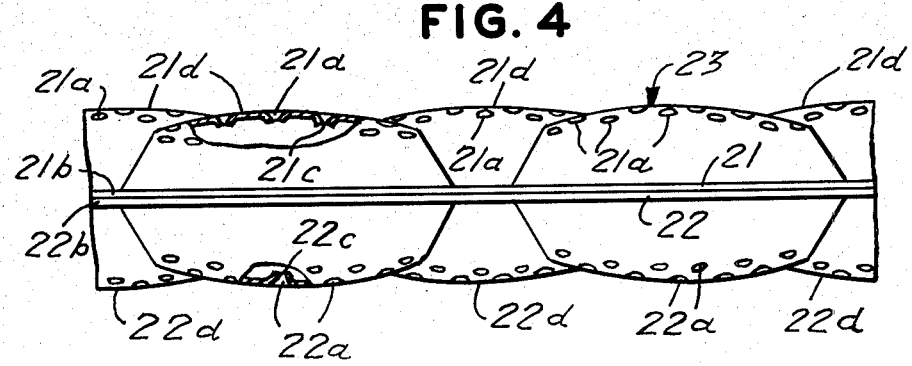
FIG. 4 is a fragmented elevational view, partly in section, of the product fabricated by the apparatus seen in FIG. 1, and looking in the direction of arrows 4-4 applied thereto.

As is best seen in FIG. 4, the finished sheet 23 is of puffy construction, as is afforded by the formation of the outwardly presented pocket portions or bosses 21d, 22d taken with slight stretching thereof as the webs are disengaged from member 26, and is rendered highly absorbent by presence of inwardly projecting, mutually confronting fibers 21c and 22c disposed about and created in the formulation of perforations 21a and 22a by members 26 solely in the pocket-portion defining plies. The sheet 23 further is rendered soft to the touch, by virtue of the fibers, projecting solely inwardly of and terminating solely within the regions enclosed by the pocket portions wherein fibers of one ply are presented generally toward the fibers of another ply.

It will be appreciated from the foregoing that the invention is characterized by both structural and process improvements in the fabrication of paper toweling, and that the invention is susceptible of modifications without departing from the scope of the appended claims.

I claim:

1. Multi-ply fibrous sheet structure comprising: a pair of plies of fibrous web material adherent to one another in substantially continuous linear regions and defining outwardly presented pocket portions in non-adherent regions thereof; and, solely in each of said non-adherent regions of said plies defining the pocket portions, means forming perforations having fibers disposed thereabout projecting solely inwardly of and terminating within the regions enclosed by the pocket portions, said fibers confronting the inwardly projecting fibers of the opposite one of said plies.

2. Sheet structure according to claim 1, and characterized in that said linear regions are of generally quadrilateral configuration.

3. Sheet structure according to claim 1, and characterized in that said means forming said perforations comprise relatively fine, inwardly presented embossments on which said fibers are disposed.

4. Sheet structure according to claim 1, 2, or 3, and characterized in that said fibrous web material comprises creped coarse fiber paper stock.

5. Multi-ply fibrous sheet structure comprising: a pair of plies of fibrous material having a plurality of mutually confronting outwardly presented embossments defining pocket portions; and a plurality of relatively fine, perforated pin embossments solely in each of the recited pocket portion-defining plies, said pin embossments being presented solely inwardly of and terminating within regions enclosed by said pocket portions, in mutually confronting relationship.

6. Sheet structure according to claim 5, and characterized in that each said ply of fibrous material comprises a web of creped coarse fiber paper stock.

7. In multi-ply fibrous sheet structure of the type including a pair of plies of fibrous material having a plurality of outwardly presented embossments defining pocket portions, the combination therewith of a plurality of relatively fine, perforated pin embossments provided solely in each of the recited pocket portion-defining plies, said pin embossments being presented solely inwardly of and terminating within regions enclosed by said pocket portions, in mutually confronting relationship.

8. In multi-ply fibrous sheet structure of the type including a pair of plies of fibrous material adhered to one another at inwardly presented land regions provided in said plies, said plies including mutually spaced confronting regions disposed between said adhered regions, the combination therewith of a plurality of relatively fine, perforated pin embossments provided solely in said spaced confronting regions of said plies, said pin embossments being presented solely inwardly of and terminating within regions enclosed by said spaced confronting regions of said plies.

* * * * *